Patented May 16, 1939

2,158,788

UNITED STATES PATENT OFFICE 2,158,788

OESTRUS-PROMOTING SUBSTANCE FROM THE ANTERIOR LOBES OF THE HYPOPHYSIS AND A PROCESS OF PREPARING IT

Willy Ludwig, Frankfort-on-the-Main-Hochst, Germany, assignor to Winthrop Chemical Company, Inc., New York, N. Y., a corporation of New York No Drawing. Application August 7, 1936, Serial No. 94,877. In Germany August 8, 1935

3 Claims. (Cl. 167—74)

The present invention relates to an oestrus-promoting substance from the anterior lobes of the hypophysis and a process of preparing it.

Processes of making active extracts from the anterior lobes of the hypophysis have become known by a great number of publications. But the extracts in question contain but a few of the hormones contained in the anterior lobes of the hypophysis. Most of these preparations are extracts of substances as they may be prepared in a similar manner also from urine or serum. Nearly all of the known processes for the preparation of gland extracts, furthermore, have the disadvantage that only a relatively small part of the active substance can be extracted from the gland, the main part remaining in the gland residue in an insoluble state. U. S. Patent No. 1,968,156 describes a process by which active extracts of the anterior lobes of the hypophysis can be made by treating the gland material with organic solvents miscible with water and subsequently extracting the gland residue by means of aqueous solvents.

I have now found that active extracts having in comparison with the products of the said Patent No. 1,968,156 the advantage of an increased purity and stability can be obtained by extracting fresh anterior lobes of the hypophysis at a temperature not exceeding 60° C. several times by means of organic solvents miscible with water, extracting the remaining gland residue with aqueous solvents and precipitating the aqueous extracts with an alcohol of low molecular weight while maintaining a pH-value between about 6 and about 8, extracting under a slightly alkaline reaction the precipitate thus obtained and again precipitating from the solution produced the active substances with the aid of an alcohol of low molecular weight, whereupon the precipitate produced is dissolved and the solution is frozen and dried.

The process is, for instance, carried out by precipitating with alcohol the aqueous extract solution used as starting material and separating as rapidly as possible the precipitate from the solution. The precipitate is then extracted several times with water containing ammonia, an extract slightly turbid colloidally being obtained which is then again precipitated with alcohol. The precipitate now obtained is dissolved in pure water or physiological salt solution, preferably with the addition of a sterilizing agent; the solution is frozen and then dried in a vacuum. A white, loose, water-soluble powder is thus obtained which may be tested by known methods. The dried powder is not liable to the danger of denaturation and is stable for a practically unlimited time.

When the anterior lobes of the hypophysis from sheep are used preliminarily treatment of the gland material with organic solvents miscible with water is not necessary. The sheep glands may be directly extracted with water and the aqueous extracts thus obtained may be subjected to the precipitation with alcohol in the manner above described.

The oestrus-promoting substance obtainable by the process of the present invention is free from ballast substances and free from oestrus retarding-substances; it is insoluble in concentrated alcohol acetone and ether, slightly soluble in a mixture of equal parts of acetone and water, showing the typical reactions of albumin, insensitive to dilute alkalies, but damaged by strong alkalies and by exposure to temperatures above 60° C.

According to the process of the present invention it is possible to dissolve from the anterior lobes of the hypophysis the whole quantity of the substance having a gonadotropic action and to obtain almost without loss a high degree of efficacy of the active substances. Thus, for instance, by implantation of the gland material and testing of the extracts obtained by my process on infantile mice it was found that the gonadotropic action is extracted by nearly 100 per cent and the degree of purity is increased from about 4 mg. per mouse unit to about 0.2 to 0.4 mg. per mouse unit. Moreover, the extracts obtained show the gonadotropic action characteristic of the premature development with increase in weight of the testicles of young cocks and premature growth of the combs of the said cocks. Furthermore, the extracts obtainable by the process of my invention contain, not only the active substances characterizing the full gonadotropic action, but also other active substances, for instance, the synergistic factor described in literature, the thyreotropic substance of the anterior lobes and the factor promoting the lactation. By the process of my invention it is, therefore, possible to prepare highly active, stable, purified extracts from the anterior lobes of the hypophysis. The process is also suitable for the commercial manufacture of the extracts from the anterior lobes of the hypophysis.

The following examples illustrate the invention:

(1) 6 grams of anterior lobes of the hypophysis are treated with acetone and then twice extracted for 2 hours at 37° C., each time with 20 cc. of physiological salt solution. The combined aqueous extracts are adjusted to a pH-value of 6.5 and strongly centrifuged. 30 cc. of a solution is obtained. This extract is mixed with 10 times its volume of ethyl alcohol, at once centrifuged and the precipitate thus obtained which is still wet with alcohol is extracted 4 times at a pH-value between 8.0 and 9.0, each time with 30 cc. of water containing ammonia. The combined extracts are centrifuged, mixed with ethyl alcohol and the precipitate thus obtained is freed from the alcohol. The precipitate is dissolved in 50 cc. of physiological salt solution, frozen after one hour and dried as usual. The dry substance obtained is soluble in water. The yield amounts to 280 milligrams.

A solution of 10 milligrams dissolved in 1 cc. of water contains per cc. 50 mouse units of gonadotropic substance. Since the 6 grams of anterior lobes equal 1500 mouse units and 280 milligrams of product were produced, each 10 milligrams of said product being equal to 50 mouse units, 1400 mouse units were recovered in the product. The substance is strongly active as measured by the synergystic action, the thyreotropic action and the lactagogenic action.

Moreover the strong action of the product was shown by the maturation of the testicles of young cocks and the growth of the combs of the said cocks.

(2) 30 grams of fresh hypophysis from sheep are ground and twice extracted at a pH-value of 7.0 at room temperature, each time for 2 hours with 20 cc. of physiological salt solution. The combined extracts are strongly centrifuged, the extract is mixed with 10 times its volume of methyl alcohol and immediately centrifuged; the precipitate thus obtained is further treated as indicated in Example 1.

I claim:

1. Process of preparing an oestrus-promoting substance from the anterior lobe of the hypophysis which comprises extracting fresh anterior lobe of the hypophysis at a temperature not exceeding 60° C. several times with the aid of an organic solvent miscible with water in which the oestrus-promoting substance is insoluble, extracting the remaining gland residue with an aqueous solvent in which the oestrus-promoting substance is soluble, precipitating the aqueous extract with a lower aliphatic alcohol at a pH-value of about 6 to 8, extracting the resultant precipitate at a feebly alkaline reaction with an aqueous solvent in which the oestrus-promoting substance is soluble and again precipitating from the solution obtained the active substances with the aid of a lower aliphatic alcohol, dissolving the precipitate produced in an aqueous solvent of the group consisting of water and physiological salt solution, freezing the solution and drying it.

2. Process of preparing an oestrus-promoting substance from the anterior lobe of the hypophysis which consists in extracting fresh anterior lobe of the hypophysis from sheep with an aqueous extracting solvent in which the oestrus-promoting substance is soluble, precipitating the aqueous extract with a lower aliphatic alcohol at a pH-value of about 6 to about 8, extracting the resultant precipitate at a feebly alkaline reaction with an aqueous solvent in which the oestrus-promoting substance is soluble and again precipitating from the solution obtained the active substances with the aid of a lower aliphatic alcohol, dissolving the precipitate produced in an aqueous solvent of the group consisting of water and physiological salt solution mixed with a sterilizing agent, freezing the solution and drying it.

3. An oestrus-promoting substance which is derived from the anterior lobe of the hypophysis by the process defined in claim 1, said substance being stable under storage and soluble in water and in physiological salt solution, the resulting solutions being compatible on injection.

WILLY LUDWIG.